Dec. 4, 1956     R. F. ANDERSON     2,772,705
MOLD FILLING MACHINE

Filed Aug. 13, 1951     5 Sheets-Sheet 1

Inventor
Ralph F. Anderson

By McKenna and Morsbach
Attorneys

Dec. 4, 1956 R. F. ANDERSON 2,772,705
MOLD FILLING MACHINE
Filed Aug. 13, 1951 5 Sheets-Sheet 2

Inventor
Ralph F. Anderson
By McCanna and Morsbach
Attorneys

Dec. 4, 1956  R. F. ANDERSON  2,772,705
MOLD FILLING MACHINE
Filed Aug. 13, 1951  5 Sheets-Sheet 4

Inventor
Ralph F. Anderson
By McCanna and Morsbach
Attorneys

Dec. 4, 1956 R. F. ANDERSON 2,772,705
MOLD FILLING MACHINE
Filed Aug. 13, 1951 5 Sheets-Sheet 5

Fig. 7

Inventor
Ralph F. Anderson
By McCanna and Morsbach
Attorneys

United States Patent Office 2,772,705
Patented Dec. 4, 1956

2,772,705

MOLD FILLING MACHINE

Ralph F. Anderson, Rockford, Ill.

Application August 13, 1951, Serial No. 241,588

30 Claims. (Cl. 141—167)

This invention relates to a mechanism for filling receptacles, and particularly to a mechanism for filling mold trays with ice cream and the like.

An object of this invention is to provide a novel mechanism which receives an empty receptacle from a continuously advancing conveyor, elevates the empty receptacle to the filling position, fills the receptacle, and lowers the filled receptacle to the level of the conveyor and discharges it onto the conveyor.

Another object of this invention is to provide a filling mechanism which includes a support for receiving a receptacle from a continuously advancing conveyor and for holding such receptacle during the filling thereof without interfering with the continuous advance of the conveyor.

Another object of this invention is to automatically retard the advance of the following receptacles carried on the conveyor while a receptacle is being filled.

Another object of this invention is to provide a filling mechanism which elevates a receptacle to the filling position automatically in response to its advance onto the support member on which it is carried during the filling operation.

Another object of this invention is to provide a novel pneumatically controlled mechanism for raising a receptacle to the filling position and for lowering the filled receptacle.

Another object of this invention is to provide in a filling mechanism a novel arrangement for selectively controlling the amount of material discharged into the receptacle during filling thereof.

It is also an object of this invention to provide a filling mechanism which includes a novel arrangement for automatically initiating the discharge of ice cream into the receptacle in response to the elevation of the receptacle to the filling position.

Other and further objects and advantages of the invention will be apparent from the following description of a preferred embodiment thereof.

In the automatic operation of the present invention, the elevating table is normally disposed at the level of a continuously advancing conveyor to receive a receptacle therefrom. In response to the advance of a receptacle carried by the conveyor onto the elevating table, the table is automatically raised and movement of the following receptacles carried on the conveyor is retarded. As the elevating table is raised a pumping mechanism is automatically actuated to discharge the material into the receptacle. The duration of the pumping operation is predetermined by means accessible to the operator from the exterior of the machine casing. After completion of the pumping operation the elevating table is automatically lowered to its normal position at the conveyor level and the filled receptacle is discharged from the elevating table onto the conveyor at the opposite side of the machine. The automatic filling sequence is then repeated in succession for each of the following empty receptacles carried on the conveyor.

Referring to the drawings, the invention includes a housing comprising a relatively wide lower portion 1 and an upstanding portion 2 at the back thereof extending upwardly therefrom. A slightly upwardly inclined wide ledge portion 3 extends from the forward edge of the lower housing portion 1 to its juncture with the front face of the rear upstanding housing portion 2.

Figure 1:
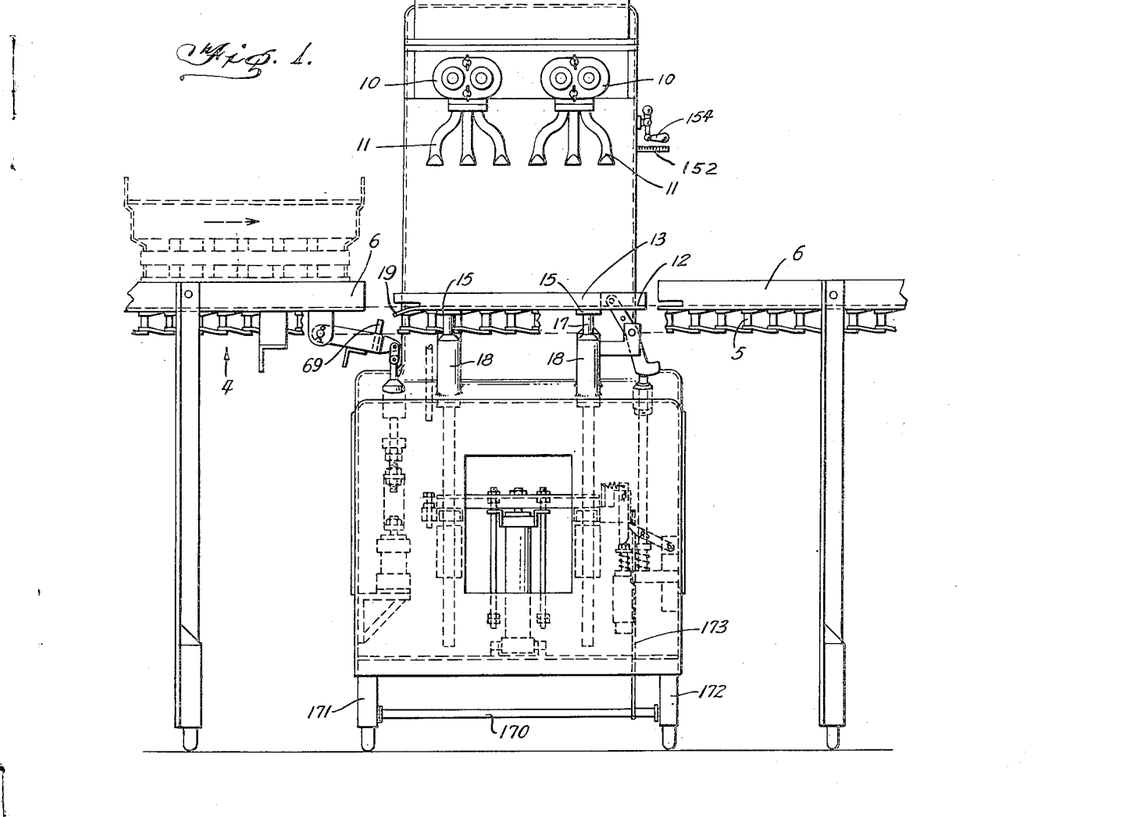
Figure 1 is a front view showing the filling mechanism of the present invention positioned to receive a receptacle from the conveyor.

An endless belt conveyor 4 passes horizontally above the ledge portion 3 of the housing for conveying mold trays to the filling machine and away therefrom. The conveyor may desirably include a chain having vertically disposed pintles 5 and suitable horizontal plates carried thereon. Angle iron side rails 6 fixedly positioned on either side of the filling machine serve to keep the conveyor plates moving in the desired direction (horizontally to the right in Figure 1).

Transverse side plates 7 extend forward from the upper housing portion 2 near the top thereof to rigidly support a filling assembly 8 in spaced relation above the ledge portion 3 of the housing and the conveyor 4. The filling assembly includes an upper container 9 which contains ice cream in semi-frozen condition, gear pumps 10 positioned below the ice cream container 9, and a plurality of discharge nozzles 11 at the outlet side of the pumps, so that the operation of the pumps controls the flow of ice cream from container 9 to the discharge nozzles.

A vertically reciprocable, horizontal elevating table 12 is disposed above housing ledge 3 for raising the mold trays one at a time toward the discharge nozzles 11 where the molds are filled with semi-frozen ice cream and for thereafter lowering the filled mold tray back onto the conveyor, which carries it from the filling machine. The elevating table includes a pair of angle irons 13, 14 extending in the direction of the conveyor movement and transverse pairs of bottom pieces 15, 16 attached at either end of the angle irons 13 and 14. These bottom pieces are carried at the upper ends of vertically reciprocable rods 17, which extend through external bosses 18 mounted on the housing ledge 3 to extend upwardly therefrom. At the respective leading edges relative to the advancing conveyor, the angle irons 13, 14 are formed with downwardly inclined lower horizontal lips 19 to facilitate the transfer of a mold tray from the conveyor onto the elevating table. In the normal retracted position of the elevating table the respective horizontal, inwardly extending angle iron arms 13a and 14a are on a level with the conveyor plates, which pass freely between the angle irons. Thus, the elevating table, while operative to receive the mold trays in succession from the conveyor, does not interfere with the travel of the conveyor.

*Automatic raising and lowering mechanism*

Figure 7:
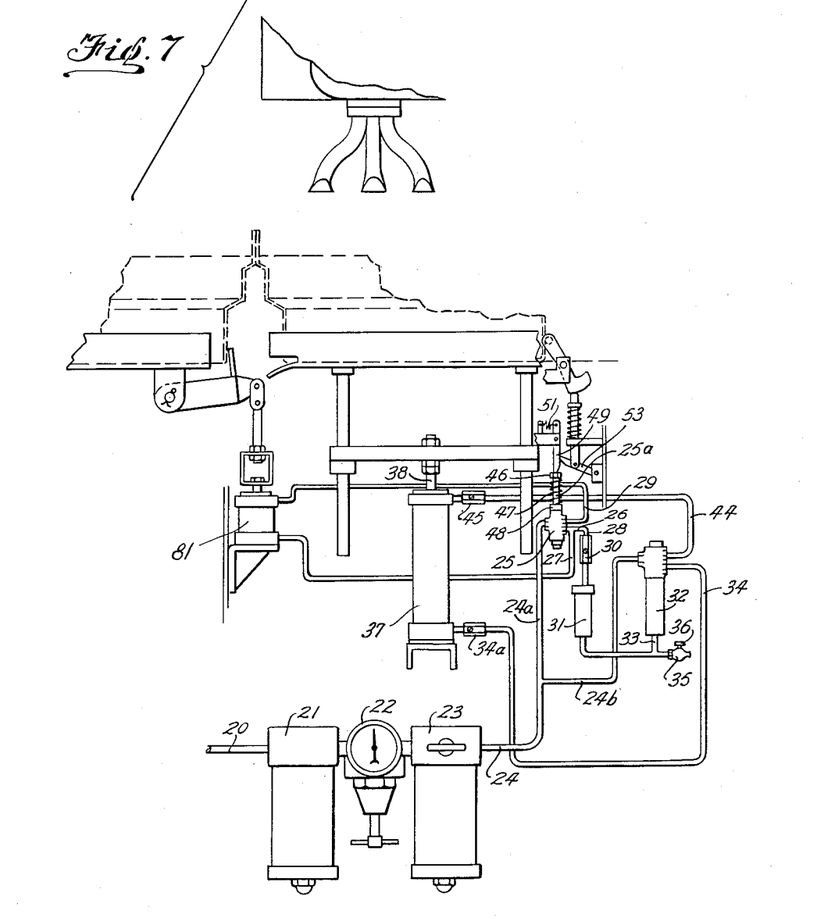
Figure 7 is a schematic diagram of the pneumatically-controlled mechanism for raising and lowering the elevating table.
Figure 8:
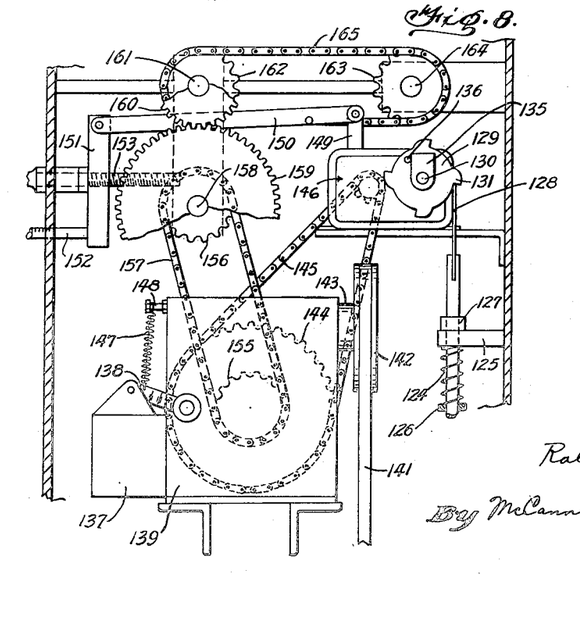
Figure 8 illustrates the driving connection for the pumps which discharge the material into the receptacles and the mechanism which controls the initiation and duration of the pumping operation.
Figure 9:
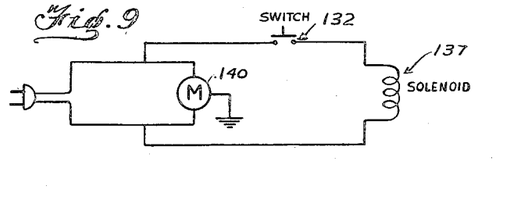
Figure 9 is a schematic circuit diagram of the electrical components of the pump control mechanism.

The raising and lowering of the elevating table is controlled automatically by a pneumatic system. As best seen in Fig. 7, this system includes an air supply conduit 20 which leads to an air filter 21, pressure regulator 22, and air lubricator 23 in sequence. At the outlet side of the air lubricator the conduit 24 leads through branch conduit 24a to a control valve 25 having two alternate outlets 26 and 29.

Figure 10:
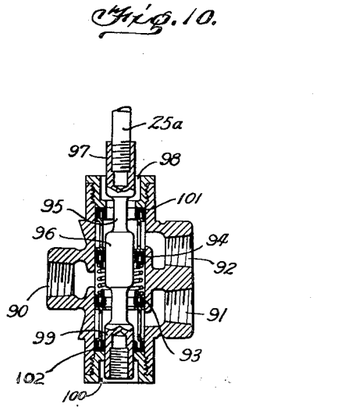
Figure 10 is a longitudinal section of the control valve incorporated in the pneumatic mechanism for raising and lowering the elevating table.

As best seen in Figure 10, the control valve 25 includes the inlet port 90 connected to conduit 24a and spaced outlet ports 91 and 92 connected respectively to the outlet conduits 26 and 29. An annular valve seat 93 is interposed between the valve inlet 90 and outlet 91, while an annular valve seat 94 is positioned between the inlet 90 and the other outlet 92. A reciprocable stem 95 carries an enlarged head 96 forming a closure member which is slidable snugly relative to the valve seats 93, 94 and forms a closure member for alternately blocking communication at the respective valve seats between the inlet 90 and one or the other of the outlets 91 and 92. An enlarged head 97 at the upper end of stem 95 forms a closure member for the upper exhaust port 98, while the enlarged head 99 at the lower end of the valve stem forms a closure member for the exhaust port 100. Suitable valve seats 101 and 102 are provided for the respective exhaust ports.

In the operation of this control valve, when the valve stem 95 is in its upper position the closure member 96 blocks the flow of air to valve outlet port 92 leading to the outlet conduit 29 and permits the flow of air through valve outlet port 91 to the outlet conduit 26. In this position, any air under pressure in conduit 29 is exhausted back through port 92 out the exhaust outlet 98.

When valve stem 95 is in its lower position the closure member 96 seats snugly within the opening formed at seat 93 to block the flow of air to outlet port 91 leading to the outlet conduit 26 and permits the flow of air through valve outlet port 92 to the outlet conduit 29. At this time, air under pressure in outlet conduit 26 is exhausted back through port 91 out the exhaust outlet 100.

The valve stem 95 is attached at its upper end to a rod 25a which extends upward beyond the casing of control valve 25. The position of rod 25a determines the operation of control valve 25 by controlling the position of the valve closure member 96 and also the positions of the exhaust port closure members 97 and 99. The mechanism for controlling the position of rod 25a will be described hereinafter.

The control valve outlet conduit 26 branches off into two separate conduits 27 and 28. Conduit 28 leads through a flow control valve 30 to a cutout valve 31, which passes a measured charge of air to operate the timing valve 32 and then to shut off the flow of air which controls the operation of the timing valve. Cutout valve 31 is of the known type which passes a certain volume of air and then closes to block any further flow of air until the air pressure at its inlet side has been released, after which it is again operative to pass a charge of air.

Figure 11:
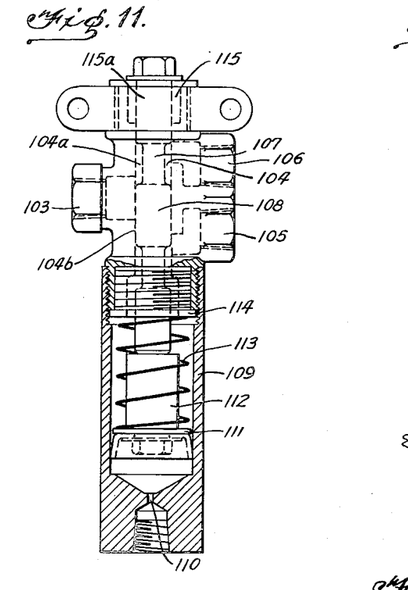
Figure 11 is a longitudinal view, partly in section, of the timing valve which forms a part of the pneumatic mechanism for raising and lowering the elevating table.

As best seen in Fig. 11, the timing valve 32 includes an inlet port 103 connected to the air supply line through branch conduit 24b ahead of control valve 25. A passageway 104 in the timing valve is interposed between the inlet 103 and a pair of outlet ports 105 and 106. Valve outlet port 105 communicates with an outlet conduit 34 leading to the bottom of air cylinder 37, while valve outlet port 106 communicates with an outlet conduit 44 leading to the top of air cylinder 37. The valve passageway 104 forms a pair of spaced circular ports 104a and 104b communicating between the outlet ports 105 and 106 and the inlet port 103.

A reciprocable stem 107 in the timing valve carries an enlarged transverse head 108 which is slidable snugly within the passageway 104 and blocks one or the other of the valve outlet ports 105, 106 from communication with the valve inlet port 104. At its upper end the valve stem 107 carries an enlarged head 115a which forms a closure member for the exhaust port 115 at the top of the timing valve.

A tubular casing 109 is attached to the lower end of the valve housing and is formed with a restricted air inlet orifice 110 at its lower end communicating with the conduit 33 leading from the cut-off valve 31. Within the casing 109 a piston 111 is carried on a plunger 112 attached to the lower end of valve stem 107. A coil spring 113 is under compression between the piston 111 and a nut 114, which is threadedly received at the upper end of the casing 109, to normally bias the piston 111 downward. This, in turn, also biases the valve closure member 108 to a position where it blocks the flow of air through the valve outlet 105 to outlet conduit 34 and permits the flow of air through the valve outlet 106 to outlet conduit 44.

When a charge of air is passed through cutout valve 31 to the timer inlet orifice 110, the piston 111 is raised by the air pressure to position the timer valve closure member 108 such that air is passed from inlet conduit 24b through the timer valve outlet 105 to the outlet conduit 34 and the flow of air from inlet conduit 24b through the timer valve outlet 106 to the outlet conduit 44 is blocked.

After the cutout valve 31 closes, following the passage through it of a predetermined amount of air, the piston 111 is returned to its normal position under the urging of spring 113 after a time delay determined by the rate at which air bleeds out the port 110 and through the metering valve 35 to atmosphere. This return movement of the piston moves the timer valve closure member 108 to its normal position blocking the flow of air to outlet port 105 and permitting the flow of air to valve outlet port 106. Metering valve 35 is manually adjustable by means of a knob 36 to control the time delay operation of the timing valve 32.

The outlet conduit 34 from the timing valve leads through flow control valve 34a to an inlet at the bottom of air cylinder 37. The air cylinder 37 includes a reciprocable piston connected to a reciprocable rod 38 extending through the upper end of the air cylinder. A horizontal frame 39, rigidly connected to the upper end of rod 38, carries the rods 17 which support the elevating table 12 for reciprocation up and down. Spaced depending rods 40 are bolted to the frame 39 and extend through apertured brackets 41 carried on a collar 42 attached to the upper end of the air cylinder 37. At their lower ends the rods 40 threadedly receive nuts 43 which abut against the lower sides of the respective brackets 41 to limit upward movement of the elevating table 12. The nuts 43 are adjustable threadedly along the length of the rods 40 to determine the height to which the elevating table can be raised. Air passing through conduit 34 enters the air cylinder 37 at the underside of the piston therein to raise the latter.

Figure 12:
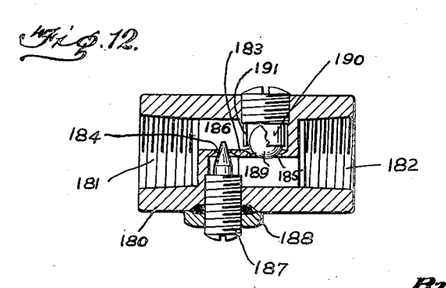
Figure 12 is a longitudinal section of one of the flow control valves used in the pneumatic circuit controlling the position of the elevating table.

The flow control valve 34a may be of the type shown in Fig. 12, wherein the flow in one direction is controlled by a tapered needle and there is free flow in the opposite direction past a ball check valve member. The flow control valve includes a tubular casing 180 having ports 181 and 182 at opposite ends. A partition 183, which separates the ports 181 and 182, is formed with two separate openings 184 and 185.

A tapered needle 186 extends into the opening 184 and is carried on a threaded screw 187, which is adjustably received in a nut 188 attached to the valve casing 180. By adjusting the screw 187, the needle 186 may be adjusted to block the hole 184, either wholly or partially any desired amount. In this manner, the flow of air through the valve from the port 181 to the port 182 may be accurately controlled.

At the other opening 185, a ball 189 is provided. A tubular fitting 190 is disposed above the ball 189 and is formed with a hole 191 at its side adjacent the valve port 181. With this arrangement, when air flows through the valve 34a from the port 182 to the port 181, the air lifts ball 189 to unblock the opening 185 and a free flow of air is permitted through the partition opening 185 and the opening 191 in the tubular fitting 190. Obviously, in this direction of air flow, the air would follow the described path of least resistance past the ball 189, and the needle 186 would not control this flow of air. On the other hand, when air flows through the valve from the port 181 to the port 182, the ball 189 seats and this air flow is under the sole control of the needle 186.

Returning to the pneumatic control system of Fig. 7, the outlet conduit 44 from the timing valve 32 leads through flow control valve 45 to an inlet to air cylinder 37 at the upper side of the piston therein. The air supplied to conduit 44 acts against the upper side of the piston in air cylinder 37 to retract the elevating table to its lower position at the level of the conveyor. The flow control valve 45 is identical with the flow control valve 34a shown in Fig. 12.

For raising the piston in the cylinder 37, the flow of air through the valve 34a is from the port 182 past the ball 189 to the port 181, so that there is provided a free flow of air to the underside of the piston at this time. The air above the piston in the cylinder 37 is exhausted through the flow control valve 45 in a direction from the port 181 thereof to the port 182, so that the release of air from above the piston is controlled by the adjustable tapered needle in the valve 45. In this manner, the flow control valve 45 determines the rate at which the elevating table 37 is raised.

For lowering the piston in air cylinder 37, there is free flow of air through flow control valve 45 to the upper side of the piston and the exhausting of air from beneath the piston is controlled by the tapered needle in flow control valve 34a. Thus, the flow control valve 34a determines the rate at which the elevating table is lowered.

The air supply through the timing valve 32 to outlet conduit 44 is under the control of the closure member 96 of control valve 25 as follows:

When control valve 25 passes a charge of air to operate the timing valve 32, air is supplied through conduit 34 to the air cylinder to raise the piston therein for raising the elevating table, and the air supply through conduit 44 opposing this movement of the elevating table is blocked. At this time, the compressed air at the upper side of the piston in air cylinder 37 and in conduit 44 is exhausted back through valve outlet port 106 and through the exhaust outlet 115 at the top of the timing valve 32 to atmosphere. When the timing valve returns to its normal condition, the air supply through conduit 34 to the underside of the piston in air cylinder 37 is blocked and the compressed air supply through conduit 44 to the upper side of the piston in air cylinder 37 is established and the elevating table is lowered.

The plunger 25a which controls the operation of control valve 25 extends upwardly through the casing thereof and terminates in a transverse enlarged head 46 at its outer free end. A coil spring 47 is under compression between the outer plunger head 46 and a collar 48 carried on the casing of valve 25 and is operative to urge the plunger 25a to its extreme upward position. In this upward position of valve plunger 25a, the closure member 96 in the control valve 25 is positioned to block the supply of air to outlet conduit 29 and to permit the supply of air to outlet conduit 26.

A depending dog 49 is pivotally mounted on a bracket 50 which is rigidly connected to the horizontal frame portion 39 of the elevating table. A coil spring 51 normally urges dog 49 to its vertical position abutting against the transverse vertical end wall 52 of bracket 50. In the lowered position of the elevating table the dog 49 pushes down on valve plunger 25a against the urging of coil spring 47, to position the closure member in control valve 25 such that air is passed to the outlet conduit 29 and is blocked from the outlet conduit 26.

In order to initiate upward movement of the elevating table the dog 49 is displaced away from its engagement on the top of valve plunger 25a so that the valve plunger may move, under the urging of spring 47, to permit the supply of air through control valve 25 to outlet conduit 26 for raising the piston in the air cylinder 37. To this end, an arm 53 is pivoted at one end at 54 to a bracket 55 rigidly mounted on the lower housing portion 1. Intermediate its ends the arm 53 is formed with an elongted slot 56 through which extends a transverse pin 57 carried on a depending rod 58 toward the lower end thereof. At its upper end the rod 58 extends through an external boss 59 formed on the ledge portion 3 of the machine housing.

A lever 60 is pivotally mounted intermediate its ends at 61 on a right angled bracket 62 attached to the rear boss 18 formed on the housing ledge 3 at the discharge side of the filling machine. Lever 60 is provided with a transverse horizontal pin 62 which extends forwardly to be interposed in the path of movement of the molds carried on the conveyor. A cam surface 63 on the lower end of lever 60 bears against the upper free end of rod 58 and, when lever 60 is rotated clockwise, is adapted to ride over the top of rod 58 to depress the latter.

Rod 58 is normally biased upward by a coil spring 64 acting between the horizontal arm 55a on bracket 55 and an enlarged transverse head 65 carried on rod 58 below the slot 56. Bracket arm 55a is apertured to slidably receive the lower end of rod 58 when the latter is depressed.

Figure 4:
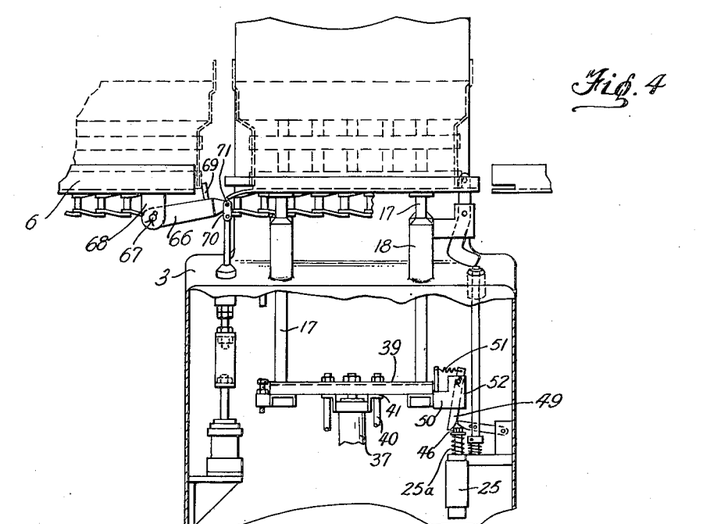
Figure 4 is a fragmentary front view of the machine, with the casing partly removed, showing the normal retracted position of the elevating table for receiving a receptacle from the conveyor and raising that conveyor to the filling position.
Figure 5:
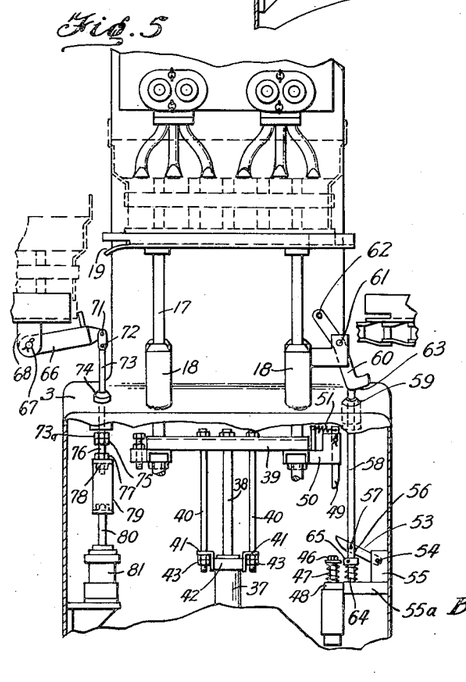
Figure 5 is a view similar to Figure 4, with the elevating table in its raised position.
Figure 6:
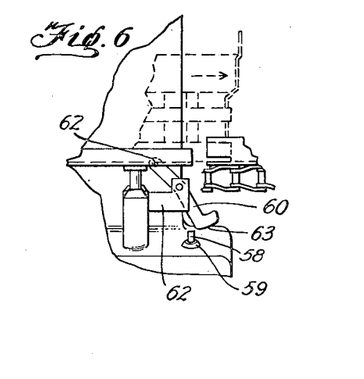
Figure 6 is a fragmentary front view showing the trip arm which is positioned at the discharge side of the filling machine and which initiates the raising of the elevating table.

When rod 58 is depressed, through its pivotal connection at 56, 57 with arm 53 it moves the free end of the latter downward to a substantially horizontal position. In so moving, the free end of rod 53 engages dog 49 to push the latter clockwise about its pivotal axis away from engagement with the top of control valve plunger 25a (see Fig. 4). This frees the control valve plunger 25a to rise under the force of spring 47 to supply air through cutout valve 31 and timing valve 32 to the conduit 34 leading to the bottom of air cylinder 37. Rod 58 is depressed when lever 60 is moved clockwise about its pivot, and this movement of lever 60 occurs when the pin 62 is engaged by a mold tray carried by the conveyor into position on the angle irons 13, 14 of the elevating table.

The pneumatically controlled mechanism of the present invention also makes provision for halting the advancing line of empty mold trays while the mold tray carried on the elevating table is being filled. For this purpose, a stop lever 66 is pivoted at 67 to a bracket 68 which hangs down from the angle iron 6 at the inlet side of the filling machine. An upwardly extending arm 69 on the stop bracket 66 is adapted, when raised, to be interposed at one side of the conveyor in the path of movement of the mold trays carried on the conveyor, whereby to block the advance of the line of empty trays while the tray carried on the elevating table is being filled. The conveyor slips frictionally under the trays to continue its advance while the trays are thus held against movement.

For thus actuating the stop lever, there is provided a yoke 70 pivotally linked at one of its ends at 71 to the outer free end of stop lever 66 adjacent the upstanding stop arm 69 thereon. At its other end the yoke is pivotally linked at 72 with a reciprocable rod 73 which extends upwardly through an external boss 74 formed on the ledge portion 3 of the housing. At its lower end within the housing the rod 73 carries an enlarged transverse nut 73a which serves as an abutment head. A similar nut 75 directly beneath the lower end of rod 73 is threadedly received on a vertical threaded rod 76 which is adjustably carried, by means of nuts 77 and 78, on an open rectangular bracket member 79. Bracket member 79 is carried on the upper end of a plunger 80 which extends through the upper end of air cylinder 81 and moves in unison with the reciprocable piston therein.

As best seen in Fig. 7, the air cylinder 81 has a top inlet leading from conduit 29 and this inlet is positioned to admit air into the air cylinder above the piston therein to retract the piston downwardly. The air cylinder 81 is also provided with a bottom inlet leading from conduit 27 to admit air into the air cylinder below the piston therein for pushing the piston upwardly to raise the stop lever 66 into its tray-halting position. Thus, when the closure member in the control valve 25 is positioned to supply air to conduit 26 for raising the elevating table, the stop lever 66 is raised to a position where its upstanding arm 69 blocks the advance of the empty mold trays behind the mold tray on the elevating table. When the closure member in control valve 25 is positioned in its other position for supplying air to conduit 29 the piston in air cylinder 81 is pushed downward to retract the stop lever 66 and permit the advance of the next empty tray onto the elevating table.

Summarizing the operation of the pneumatically controlled mechanism: It is assumed that initially there is no mold tray on the side rails 13, 14 of the elevating table. Also, initially the elevating table is in its lowered position and the dog 49 is in its normal vertical position pressing valve plunger 25a to position the closure member 96 of control valve 25 such that air is passed to outlet conduit 29 to maintain the piston in air cylinder 81 down, whereby to keep the stop lever 66 retracted. The closure member 108 in the timing valve 32 is in its normal position under the urging of spring 113 to pass air to the outlet conduit 44 for exerting a downward force on the piston in air cylinder 37 to maintain the elevating table 12 in its lowered position.

As the conveyor advances, it carries an empty mold tray onto the side rails 13, 14 of the elevating table. The leading edge of the advancing mold tray is carried forward until it abuts against the cross pin 62 on the trip lever 60. The trip lever 60 moves pivotally in a clockwise direction to depress rod 58 and carry the free end of pivoted arm 53 into engagement with dog 49 to displace the latter clockwise away from its normal vertical position bearing down against the top of control valve plunger 25a. The control valve plunger 25a under the urging of coil spring 47 is then free to rise to move the closure member 96 in the control valve 25 to its other position, where it passes air to the outlet conduit 26 and blocks air from passing to the outlet conduit 29. A portion of the air supplied to conduit 26 passes through conduit 27 to the underside of the piston in air cylinder 81 to raise the latter and move the stop lever 66 upward to a position where its upstanding arm blocks the advance of the next empty mold tray. The exhaust from the upper side of the piston in air cylinder 81 passes through conduit 29 back through the control valve conduit 92 to the exhaust outlet at 98 communicating with the atmosphere. At the same time, the remainder of the air supplied to conduit 26 passes through conduit 28 to the cut-off valve 31 which supplies a predetermined charge of air through conduit 33 to the inlet orifice 110 at the underside of the piston 111, which controls the operation of timing valve 32. This piston is raised against its spring bias by this charge of air to move the timing valve closure member 108 to its other position where it permits the passage of air from inlet conduit 24b to the outlet conduit 34 and blocks the passage of air from inlet conduit 24b to the outlet conduit 44. The air supplied to conduit 34 enters the air cylinder 37 at the underside of the piston to raise the latter and thereby elevate the elevating table, with the empty mold carried thereon, to the desired height, determined by the adjustable nuts 43, to a position immediately below the discharge nozzles 11. The compressed air at the upper side of the piston in air cylinder 37 is exhausted through conduit 44 back through timing valve outlet port 106 to the exhaust outlet 115 in the timing valve.

During this phase of the operation, while the stop lever 66 is positioned to halt the advance of the following line of empty mold trays, the conveyor slips frictionally under the halted trays to continue its advance.

As the upward movement of the elevating table and the empty mold tray thereon continues, the mold tray carried on the elevating table moves upward away from its engagement with the trip lever 60, permitting the latter to return to its normal position and release the downward force which its lower cam surface 63 has exerted on the rod 58. When the trip lever returns to its normal position its upper end is disposed beneath the tray, so that when the filled tray descends it strikes against the upper end of trip lever 60 to pivot the latter counter-clockwise so as not to prevent the discharge of the filled tray onto the conveyor at the discharge side of the filling machine.

With this release of the downward force on rod 58 the latter returns to its normal, upwardly-extended position under the urging of spring 64 to move the free end of arm 53 counter-clockwise upwardly away from its horizontal position, in which it engages dog 49 to unseat the latter from engagement with control valve plunger 25a.

The pivoted dog 49 of course moves upward in unison with the elevating table, and after clearing the free end of arm 53 is returned by spring 51 to its normal vertical position, to be adapted to engage the upper end of control valve plunger 25a when the elevating table is lowered again.

After the mold tray is filled from the nozzles 11 the elevating table is lowered automatically by the described pneumatically operated mechanism. The time interval during which the elevating table is held in its upper position for the mold-filling operation is determined by the rate at which compressed air at the underside of the piston 111 for the timing valve 32 is permitted to bleed out of metering valve 35 to atmosphere. The knob 36 on this metering valve is adjusted to produce the desired time interval during which piston 111 is maintained in its raised position against the urging of spring 113 to hold the timing valve closure member 106 in the position where air is permitted to flow through the timing valve to the outlet conduit 34.

When piston 111 returns to its normal position, the timing valve closure member 106 moves to its normal position blocking the supply of compressed air to outlet conduit 34 and permitting the supply of compressed air from inlet conduit 24b to the outlet conduit 44. The air supplied to conduit 44 is fed into the air cylinder 37 at the upper side of the piston therein to cause the descent thereof, thus lowering the elevating table and the mold tray thereon which has just been filled.

When the elevating table descends to the level of the conveyor, the filled mold tray pivots the trip lever 60 out of the way in the described manner. The dog 49, which descends with the elevating table, engages the top of control valve plunger 25a to move the closure member 96 in control valve 25 to the position where it blocks the supply of air to outlet conduit 26 and admits compressed air to outlet conduit 29. The air thus supplied to conduit 29 enters air cylinder 81 at the upper end thereof to push the piston therein downward and thereby retract the stop lever 66 away from its tray-blocking position. The air pressure at the underside of the piston in air cylinder 81 is exhausted to atmosphere through conduits 27, 26, back through control valve outlet port 91 to the exhaust port 100. Likewise the air pressure at the inlet side of cutout valve 31 is released through conduits 28 and 26, back through control valve outlet port 91 and through the exhaust port 100 in the control valve to atmosphere.

The following empty tray, under the action of the continuously advancing conveyor, moves forward onto the side rails 13, 14, while the filled mold tray is carried by the continuously advancing conveyor off the side rails at the discharge side of the filling machine. The filled tray rides over the top of trip lever 60 at the exit side of the machine and is carried therefrom by the conveyor. As soon as the filled tray has passed over it, the trip lever 60 rises to its normal position where its cross pin 62 is positioned to be engaged by the leading edge of the next empty tray which has just moved onto the side rails 13, 14 of the elevating table. Thus, the elevating and lowering mechanism is conditioned to repeat the foregoing sequence of operations with the next mold tray to be filled.

*Filling mechanism*

Turning now to the filling mechanism, which operates automatically to discharge ice cream through the nozzles 11 to the receptacles in the mold tray carried on the elevating table, a horizontal arm 120 is rigidly attached to the frame 39 of the elevating table 12 to move in unison therewith. The arm 120 extends rearwardly and at its rear free end carries a vertically adjustable screw 121. A reciprocable vertical rod 122 disposed within the upper rear portion 2 of the casing is directly above the screw 121 in line with the latter's path of movement. A bracket member 123 fixed to the upper casing portion 2 guides the rod 122 for sliding reciprocation. A coil spring 124 acts between a similar upper guide bracket 125 and an enlarged head 126 carried on the rod 122 to normally bias the rod to its lowermost position, which is determined by the engagement of another enlarged head 127 on the rod against the upper side of guide bracket 125. At its upper end the rod 122 carries an elongated flexible blade 128 which normally extends vertically.

Figure 2:
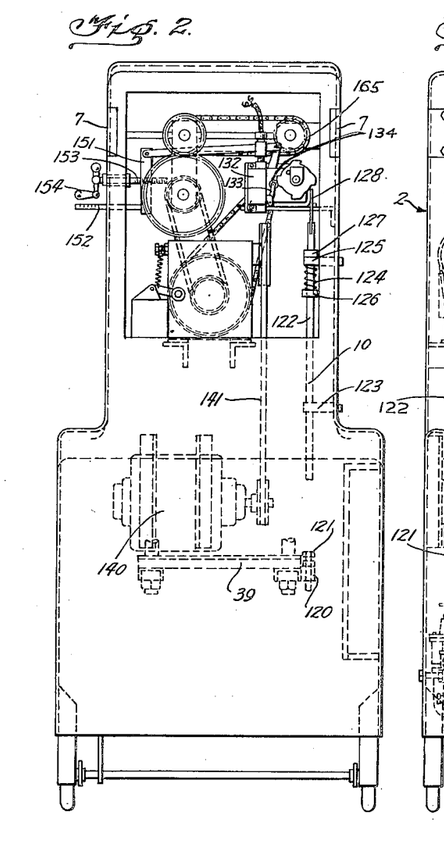
Figure 2 is a rear view of the filling mechanism.
Figure 3:
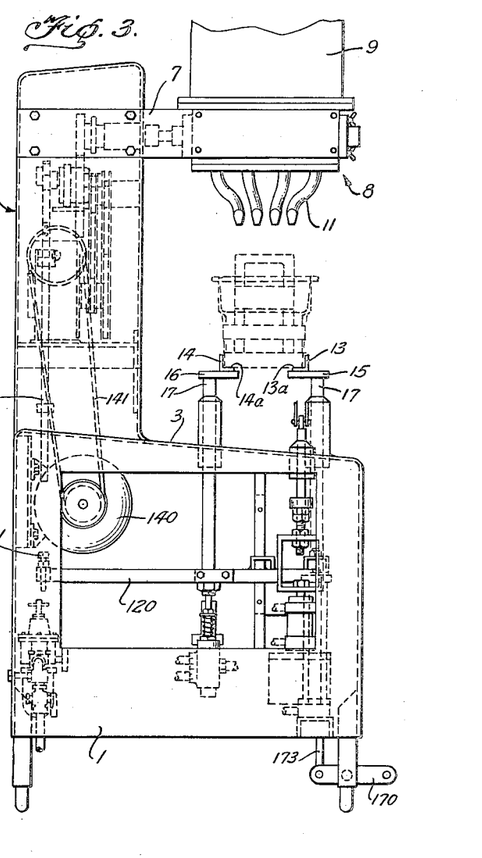
Figure 3 is an end view of the filling mechanism taken from its inlet end with respect to the conveyor.

A rotary cam 129, loosely mounted on a horizontal shaft 130, has a plurality of projecting portions 131, here shown as four in number. One of the projecting portions is normally positioned directly above the upper end of blade 128 such that when rod 122 is pushed upward, when the elevating table is raised, the blade 128 engages the under face of the adjacent cam projection 131 immediately above it to rotate the cam about shaft 130. At the other side of the cam 129 there is positioned a precision snap-acting switch 132 (Fig. 2) under the control of a pivoted operator 133 which carries a roller 134 at its free end engaging against the adjacent peripheral surface of cam 129. Switch 132 controls the driving connection from the motor 140 to the shaft 130. When the roller 134 is engaging one of the projections 131 on cam 129 the switch 132 is open to disconnect the driving connection from the motor, and shaft 130 does not rotate. However, when cam 129 is rotated counter-clockwise by the action of blade 128, when the elevating table is raised to the mold-filling position, the cam projection 131 which has been engaging roller 134 to hold switch 132 open rides down past the roller so that the roller 134 moves outward into engagement with the inner peripheral surface of the cam and switch 132 is closed. The resultant completion of the driving connection from the motor causes shaft 130 to be driven thereby counter-clockwise. A dog 135 carried on shaft 130 rotates therewith and strikes a transverse pin 136 carried on the cam 129. By the engagement of these parts the cam 129, although loosely mounted on shaft 130, is caused to rotate in unison therewith to bring the following cam projection 131 into engagement with roller 134. As roller 134 rides up over the inclined face of this next cam projection 131, the switch operator 133 moves to its former position to open the switch 132 and thereby stop the rotation of shaft 130. Thus, it will be seen that the invention provides two successively operating means for moving cam 129 to control the switch 132: initial movement of cam 129 is caused by blade 128 as the elevating table rises; and, after the blade has moved the cam to close switch 132 and the blade has cleared the cam projection which it engaged, the lost motion connection 135, 136 between shaft 130 and cam 129 effects the final movement of the cam to again open the switch 132.

Switch 132 controls the energization of a solenoid 137 whose armature is pivotally connected to one end of a lever 138. Lever 138 controls a clutch mechanism, indicated generally at 139, which is driven from motor 140 through belt 141, pulley 142, and shaft 143. Gear 144 is rotated when the clutch is engaged, to in turn drive a chain 145 meshing with a gear mechanism, indicated generally at 146, by which shaft 130 is rotated. Normally, lever 138 is biased to its clutch-disengaging position by a coil spring 147 connected at its other end to a screw 148 extending outward from the housing of the clutch 139. The bias of spring 147 is overcome when the solenoid is energized, so that lever 138 is pulled down to cause engagement of the clutch 139 and effect rotation of shaft 130 through the driving connection from motor 140 which includes belt 141, pulley 142, shaft 143, clutch 139, gear 144 and chain 145 to the gear mechanism 146 for rotating the shaft 130.

The gear mechanism 146 for rotating the shaft 130 includes a variable speed drive of known design for varying the speed of rotation of the shaft 130. A lever 149 whose angular position controls the variable speed drive is pivotally connected at its upper end to one end of an elongated, generally horizontal bar 150. At its other end the horizontal bar 150 is pivotally mounted on a depending bracket 151. At its lower end the bracket 151 carries a horizontal indicator rod 152 which extends slidably through a hole in the housing and is graduated and provided with indicia thereat. Intermediate its length the bracket 151 threadedly receives a screw 153 which may be rotated by means of a handle 154, which is positioned at the outside of the upper casing portion. Thus, by rotating the handle 154, the angular position of lever 149 may be adjusted to adjust the speed of rotation of shaft 130. The indicator bar 152 moves simultaneously with the handle 154 to indicate the setting of the variable speed drive.

The shaft on which sprocket 144 is mounted also carries a sprocket 155 which drives a sprocket 156 through the chain 157. Sprocket 156 is carried on a shaft 158 which also carries one gear 159 of a change gear mechanism. The other gear 160 of this mechanism is carried on a shaft 161 and is in mesh with gear 159 to drive shaft 161 when gear 159 rotates. Another gear 162 carried on shaft 161 is connected to a gear 163 carried on shaft 164 by means of a chain 165, so that rotation of shaft 161 effects simultaneous rotation of shaft 164. The respective shafts 161 and 164 drive pump gears for discharging ice cream from the container 9 through the nozzles 11.

The gears 159, 160 are replaceable by different pairs of gears in order to change the speed at which the pump gears operate.

The time during which the pump gears operate is, of course, determined by the time necessary for the cam 129 to go through one cycle of operation, wherein it permits switch 132 to close and then opens the switch when the next cam projection 131 is moved into engagement with roller 134. This cycle of operation of the cam is determined by the speed at which shaft 130 rotates, which in turn is governed by the setting of the handle 154 for the variable speed drive. Thus, the time during which the pump gears operate can be varied within limits by the adjustment of handle 154. However, should any great change be desired in the amount of ice cream discharged by the pumps in one filling cycle, it is necessary to substitute a new pair of gears 159, 160 to supply a different constant speed drive for the pump gears and operate the latter at a different fixed speed.

In the operation of this mechanism, as the elevating table is raised in the manner already described the extension screw 121 will engage rod 122 to push the latter upward. Blade 128 moves upward to engage the adjacent cam projection 131 directly above it, and the cam 129 is moved counter-clockwise in the drawings to close switch 132. This energizes solenoid 137 to move lever 138 into the position where it causes clutch 139 to be engaged.

Engagement of the clutch completes the drive from motor 140 to the shafts 161, 164 for driving the pump gears, so that ice cream in semi-frozen form is discharged by the pump mechanism through the discharge nozzles 11. The pump gears rotate at a fixed speed determined by the particular gears 159, 160.

At the same time, clutch 139 when engaged completes the drive from motor 140 to the shaft 130 on which cam 129 is loosely mounted. Shaft 130 is thereby caused to rotate, at a speed determined by the setting of handle 154 controlling the variable speed transmission to shaft 130. The initial displacement of cam 129 by the blade 128 has moved cam pin 136 clockwise away from the dog 135 carried on shaft 130. Thereafter shaft 130 begins to rotate, as described, and dog 135 is moved into engagement with the pin 136 to carry the cam 129 for rotation in unison with shaft 130. The rotation of shaft 130 continues until the cam 129 has been moved to position its next projection 131 in engagement with the roller 134, to open switch 132. Solenoid 137 is thereby deenergized to disengage the clutch 139 and stop the rotation of shaft 130 and of the shaft 161, 164 for operating the pumps. No more ice cream is discharged into the elevated mold tray.

The elevating table is then lowered under the control of timing valve 32, as described already.

In some instances, such as in the filling of multi-flavor ice cream bars, it is desired that the elevating and lowering mechanism be under the control of the operator of the machine, rather than automatic in its operation. For using the present invention in that manner, with the filling machine interposed in a conveyor as shown, a permanent stop (not shown) is inserted in the conveyor line to prevent the advance of the empty trays, while at the same time not interfering with the advance of the conveyor itself. Also, a clip, or other suitable means, is used to hold the trip arm 60 in its retracted position where its lower cam surface 63 is away from engagement with the upper end of rod 58.

Figure 13:
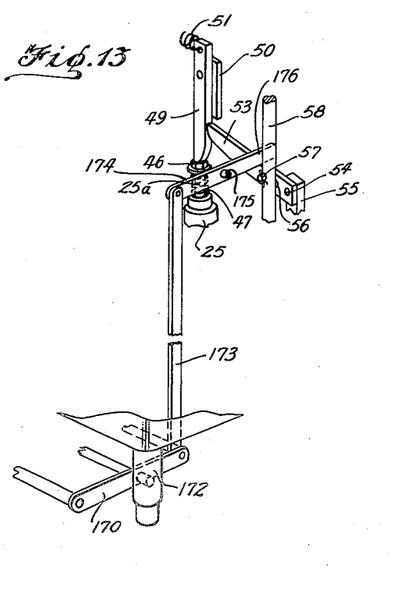
Figure 13 is a fragmentary view showing the foot treadle for operator-controlled initiation of the operation of the filling mechanism.

The operator manually lifts an empty tray from the conveyor onto the elevating table 12. For selectively controlling the operation of the pneumatic mechanism for raising and lowering the elevating table 12 a pivoted foot treadle 170 extends horizontally between spaced front legs 171, 172 at the bottom of the machine. An upwardly extending rod 173 at its lower end is pivotally linked with the foot treadle 170. At its upper end, rod 173 is pivotally connected to one end of a normally horizontal arm 174 (Fig. 13), which is pivotally mounted at 175 intermediate its ends. The other end 176 overlies the free end of the pivoted rod 53 and is adapted to force the latter downward to displace arm 49 from engagement with the top of plunger 25a of the control valve. Normally, the arm 174 does not exert such downward force on the arm 53.

When the foot treadle is actuated, rod 173 is moved upwardly. This causes the free end 176 of arm 174 to move downward to engage and force downward the free end of pivoted arm 53. Arm 53 pushes arm 49 away from engagement with the valve plunger 25a, so that the latter is free to move under the bias of spring 47 to a position where control valve closure member 96 passes air through the control valve to the outlet conduit 26 and blocks the flow of air to outlet conduit 29.

The elevating table is then raised pneumatcially in the described manner, and is lowered automatically after a time delay determined by metering valve 35. The filling mechanism operates automatically in response to the elevation of the elevating table 12, in the manner already described in detail.

After the tray has been filled in the desired manner and the elevating table has lowered the filled tray, the operator lifts the filled tray onto the moving conveyor at the exit side of the machine.

While in the foregoing detailed description there has been disclosed a specific preferred embodiment of the present invention, it is to be understood that modifications and variations from the described form may be resorted to without departing from the spirit and scope of the present invention.

I claim:

1. In a mechanism for filling mold trays carried on a continuously advancing conveyor, the combination of an elevating table positioned to receive a mold tray from the conveyor as the latter advances, a trip arm pivotally mounted adjacent the discharge end of the elevating table and interposed in the path of movement of the trays advancing onto the elevating table, pneumatic means actuated in response to the engagement of said trip arm by the mold tray which has advanced onto the elevating table for raising the elevating table and the mold tray carried thereon to the filling position, means operative while said elevating table is raised for retarding the advance of the following mold trays carried on the continuously advancing conveyor, means responsive to the lowering of the elevating table for displacing said trip arm away from its tray engaging position to permit the discharge of the filled tray from the elevating table onto the continuously moving conveyor at the discharge side of the elevating table, and means responsive to the lowering of the elevating table for rendering inoperative said tray retarding means to permit the following tray to be advanced by the conveyor onto the elevating table.

2. In a mechanism for filling receptacles carried on a conveyor, the combination of an elevating table positioned intermediate the ends of said conveyor to receive a receptacle from the conveyor, a trip arm interposed in the path of movement of the receptacle advancing onto the elevating table, and means operative in response to the engagement of said trip arm by the receptacle which has advanced onto the elevating table for raising the elevating table and said receptacle to the filling position and for lowering said table after the receptacle carried thereby has been filled to discharge that receptacle back onto the conveyor, said trip arm being arranged to be engaged by the receptacle as the latter is lowered and removed thereby out of the path of movement of the receptacle on the conveyor.

3. In a mechanism for filling receptacles carried on a conveyor, the combination of an elevating table for raising a receptacle to the filling position, means controlling the raising and lowering of said elevating table normally maintaining the elevating table in its lower position, said elevating table in its lower position being positioned to receive a receptacle from the conveyor, a trip arm interposed in the path of movement of the receptacle advancing onto the elevating table, means responsive to the engagement of said trip arm by the receptacle which has advanced onto the elevating table for supplying a limited measured charge of compressed air to actuate said controlling means to raise the elevating table and said receptacle, and a metering valve operative to exhaust said measured charge of air to atmosphere to provide a time delay during which the elevating table is maintained in its raised position during filling of said receptacle.

4. In a mechanism for filling receptacles carried on a conveyor, the combination of an elevating table positioned intermediate the ends of the conveyor to receive a receptacle from the conveyor and to discharge a filled receptacle thereto, a trip arm interposed in the path of movement of the receptacle advancing onto the elevating table, means operative in response to the engagement of said trip arm by the receptacle which has advanced onto the elevating table for raising the elevating table and said receptacle to the filling position, said trip arm being arranged to be engaged by the receptacle on the table as the latter is lowered to be moved thereby out of the path of movement of the receptacle as it is carried by the conveyor from the table to permit the discharge of the filled receptacle from the elevating table onto the conveyor.

5. In a mechanism for filling receptacles, the combination of an elevating table for raising the receptacle to the filling position, fluid pressure means for controlling the raising and lowering of said elevating table, a fluid pressure responsive valve controlling the supply of fluid under pressure for raising and lowering said elevating table, said valve being normally biased to maintain the elevating table at its lower position, means for supplying a limited predetermined quantity of fluid to render said valve operative to raise the elevating table, and time delay means for releasing said quantity of fluid to return said valve to its normal position for lowering the elevating table and for maintaining the elevating table at its lower position.

6. In a mechanism for filling receptacles, the combination of an elevating table for raising a receptacle to the filling position, compressed air means controlling the raising and lowering of said elevating table, a valve controlling the compressed air supply for raising and lowering the elevating table, spring means normally biasing said valve to maintain the elevating table in its lower position, a piston controlling said valve, means operative to supply a limited measured charge of air to actuate said piston to overcome the spring bias on said valve to render said valve operative to supply compressed air for raising the elevating table, and a metering valve operative to release said measured charge of air to permit said valve to return to its normal position under its spring bias to lower the elevating table after a time delay and to maintain the elevating table at its lower position.

7. In a mechanism for filling receptacles, the combination of an elevating table for raising a receptacle to the filling position, means controlling the raising and lowering of said elevating table normally maintaining the elevating table in its lower position, means for supplying a limited measured charge of compressed air for actuating said controlling means to raise the elevating table, and time delay means operative to maintain the elevating table raised for a predetermined time interval.

8. In a mechanism for filling receptacles, the combination of an elevating table for raising a receptacle to the filling position, means controlling the raising and lowering of said elevating table and normally maintaining the elevating table in its lower position, means operative to supply a limited measured charge of compressed air for actuating said controlling means to raise the elevating table, and a metering valve operative to exhaust said measured charge of air to atmosphere at a predetermined rate to provide a time delay during which the elevating table is maintained in its raised position.

9. In a mechanism for filling receptacles, the combination of an elevating table for raising a receptacle to the filling position, means controlling the raising and lowering of said elevating table operative to normally maintain the elevating table in its lower position, a cutout valve operative to supply a limited charge of compressed air for actuating said controlling means to raise the elevating table and operative to block any further flow of compressed air as long as there is air under pressure at its inlet side, a metering valve operative to exhaust said measured charge of air to atmosphere at a predetermined rate to provide a time delay during which the elevating table is maintained in its raised position, and means responsive to the lowering of said elevating table for releasing the air pressure at the inlet side of said cutout valve to condition the cutout valve for subsequent reoperation.

10. In a mechanism for filling receptacles carried on a continuously advancing conveyor, the combination of a support normally positioned to receive sucessive receptacles from the conveyor, means actuated in response to the advance of a container onto said support operative to move said support from said normal position thereof to convey said receptacle to the filling position, discharge means operative when actuated to discharge material into the receptacle, a source of motive power having a driving connection to said discharge means for actuating the latter to discharge material at a fixed rate, a clutch in the driving connection from said source of motive power to said discharge means for controlling the actuation of said discharge means, and means actuated in response to said movement of the support operative to effect engagement of said clutch to cause said discharge means to be actuated to discharge material into said receptacle.

11. In a mechanism for filling a receptacle with material, the combination of discharge means operative when actuated to discharge material into the receptacle, a motor having a driving connection to said discharge means for actuating the latter to discharge material at a fixed rate, a solenoid-operated clutch in the driving connection from the motor to said discharge means, a rotary cam controlling the energization of the solenoid which operates said clutch, and means forming a driving connection from the motor to the cam for rotating the latter, said driving connection to the cam including a manually-controlled variable speed drive for selectively controlling the speed of rotation of the cam to determine the time of energization of said solenoid for completing the driving connection from the motor to said discharge means.

12. In a mechanism for filling a receptacle with material, the combination of discharge means operative when actuated to discharge material into the receptacle, a motor having a driving connection to said discharge means for actuating the latter to discharge material at a fixed rate, an intermittently rotated cam, means forming a driving connection from the motor to the cam including a manually-controlled variable speed drive for selectively controlling the speed of rotation of said cam, a solenoid-operated clutch in the driving connection from the motor to said discharge means, a switch controlling the energization of the solenoid which controls said clutch, said switch being controlled by the cam to control the driving connection from the motor to said discharge means, and means responsive to the movement of a receptacle to the filling position for initiating rotation of the cam to close the switch to energize the solenoid for causing the actuation of said discharge means for a time interval determined by the speed of rotation of the cam, as determined by the variable speed drive in the driving connection from the motor to the cam.

13. In a mechanism for filling a receptacle with material, the combination of pump means operative when driven to discharge material into the receptacle, a motor having a driving connection to said pump means for driving the latter at a fixed speed, an intermittently rotated cam, means forming a driving connection from the motor to said cam and including a manually-controlled variable speed drive for selectively controlling the speed of rotation of said cam, a solenoid-operated clutch in the driving connection from the motor to said pump means and in the driving connection from the motor to said cam, a switch controlling the energization of the solenoid which controls said clutch, said switch being controlled by said cam to control the respective driving connections from the motor to the pump means and to the cam, and means responsive to the raising of a receptacle to the filling position for initiating rotation of said cam to close the switch for causing the pump means to be driven from the motor and for effecting rotation of the cam from the motor for a time interval determined by the setting of said variable speed drive in the driving connection from the motor to the cam.

14. In a mechanism for filling a receptacle with material, the combination of discharge means operative when actuated to discharge material into the receptacle, a motor having a driving connection to said discharge means for actuating the latter to discharge material at a fixed rate, a rotary cam, means forming a lost motion driving connection from the motor to the cam and including a manually-controlled variable speed drive for selectively controlling the speed of rotation of the cam when driven by the motor, a clutch in the driving connection from the motor to said discharge means and in the driving connection from the motor to the cam, said cam by its position about its rotational axis being operative to control said clutch, and means responsive to the movement of a receptacle to the filling position for initiating rotation of the cam independent of the motor to actuate the clutch to complete the driving connection from the motor to said discharge means to actuate the latter, said lost motion driving connection from the motor to the cam being operative after a time interval following said actuation of the clutch to effect continued rotation of the cam from the motor, said cam being operative upon said continued rotation to effect disengagement of the clutch to discontinue the discharge of material by said discharge means.

15. In a mechanism for filling receptacles carried on a continuously advancing conveyor, the combination of an elevating table positioned to receive successive receptacles from the conveyor and to support such receptacles during the filling thereof, means for raising the elevating table and the receptacle carried thereon to the filling position, discharge means operative when actuated to discharge material into this receptacle, a source of motive power having a driving connection to said discharge means for actuating the latter at a fixed setting, a clutch in the driving connection from said source of motive power to said discharge means for controlling the actuation of said discharge means, adjustable timing means controlling the operation of said clutch to determine the time during which said discharge means is actuated, means operative while said elevating table is raised for retarding the advance of the following receptacles carried on the continuously advancing conveyor, and means responsive to the lowering of said elevating table for rendering inoperative said retarding means to permit the following receptacle to be advanced onto the elevating table.

16. In a mechanism for filling mold trays carried on a continuously advancing conveyor, the combination of an elevating table positioned to receive a mold tray from the conveyor as the latter advances, a trip arm pivotally mounted adjacent the discharge end of the elevating table and interposed in the path of movement of the trays advancing onto the elevating table, pneumatic means actuating in response to the engagement of said trip arm by the mold tray which has advanced onto the elevating table for raising the elevating table and the mold tray carried thereon to the filling position, pump means operative when driven to discharge material into the mold tray at the filling position, a motor having a driving connection to said pump means for driving the latter at a fixed speed, an intermittently rotated cam, means forming a driving connection from the motor to said cam and including a manually-controlled variable speed drive for selectively controlling the speed of rotation of said cam, a solenoid-operated clutch in the driving connection from the motor to said pump means and in the driving connection from the motor to said cam, a switch controlling the energization of the solenoid which controls said clutch, said switch being controlled by said cam to control the respective drive connections from the motor to the pump means and to the cam, means responsive to the raising of a mold tray to the filling position for initiating rotation of said cam to close the switch for causing the pump means to be driven from the motor and for effecting rotation of the cam from the motor for a time interval determined by the setting of said variable speed drive in the driving connection from the motor to the cam, means operative while said elevating table is raised for retarding the advance of the following mold trays carried on the continuously advancing conveyor, means responsive to the lowering of the elevating table for displacing said trip arm away from its tray engaging position to permit the discharge of the filled tray from the elevating table onto the continuously moving conveyor at the discharge side of the elevating table, and means responsive to the lowering of the elevating table for rendering inoperative said tray retarding means to permit the following tray to be advanced by the conveyor onto the elevating table.

17. In a mechanism for filling receptacles on a continuously advancing conveyor, the combination of an elevating table positioned to receive successive receptacles from the conveyor and to support such receptacles during the filling thereof, means for raising and lowering the elevating table and the receptacle carried thereon, an operating member movable between operative and inoperative positions, means responsive to the advance of a receptacle onto the table for moving said member to its operative position and responsive to lowering of the table for moving the member to its inoperative position, means responsive to movement of the member to its operative position for retarding the advance of the following receptacles carried on the continuously advancing conveyor, and means responsive to movement of the operating member to its inoperative position for rendering said retarding means inoperative to permit the following receptacle to be advanced onto the elevating table.

18. In a mechanism for filling receptacles, a continuously advancing conveyor, a support positioned intermediate the ends of said conveyor to receive successive receptacles from the conveyor, an operating member movable between an operative and an inoperative position, means responsive to movement of said member to said operative position for elevating said support and for lowering the support a predetermined time after the elevating thereof, means for retarding the advance of receptacles on said conveyor, means responsive to movement of said member to said operative position for rendering said retarding means operative and for rendering said retarding means inoperative in response to movement of said member to its inoperative position, means responsive to the advance of a receptacle onto said support for moving said operating member to its operative position, and means responsive to lowering of said support for moving said operating member to its inoperative position.

19. In a mechanism for filling receptacles, a continuously advancing conveyor, a support positioned intermediate the ends of said conveyor to receive successive receptacles from the conveyor, an operating member movable between an operative and an inoperative position, means responsive to movement of said member to said operative position for elevating said support and for lowering the support a predetermined time after the elevating thereof, means for retarding the advance of receptacles on said conveyor, means responsive to movement of said member to said operative position for rendering said retarding means operative and for rendering said retarding means inoperative in response to movement of said member to its inoperative position, a trip arm positioned in the path of movement of said receptacle on said conveyor and responsive to the advance of a receptacle onto said support for moving the operating member to its operative position, said trip arm being arranged to be engaged by the receptacle on the support as the latter is lowered and be moved thereby out of the path of movement of the receptacle as it moves on the conveyor off the support, and means responsive to lowering of said support for moving said operating member to its inoperative position.

20. In a mechanism for filling receptacles carried on a conveyor, the combination of a conveyor, a filling mechanism disposed above said conveyor intermediate the ends thereof, an elevating table disposed below said filling mechanism, means operative to raise said table and thereafter lower the table, means responsive to raising of said table for operating said filling mechanism, and trip means positioned to be engaged by the receptacles advanced by the conveyor onto said table for actuating said table operating means and thereby initiate a cycle of raising the receptacle, filling the receptacle while in its raised position and, thereafter lowering the filled receptacle back onto the conveyor to be moved thereby off from the elevating table.

21. In a mechanism for filling receptacles carried on a conveyor, the combination of a conveyor, a filling mechanism disposed above said conveyor intermediate the ends thereof, an elevating table disposed below said filling mechanism, means operative to raise said table and thereafter lower the table, means responsive to raising of said table for operating said filling mechanism, means including a trip arm positioned in the path of advance of the receptacles by the conveyor onto said table for actuating said table operating means and thereby initiate the cycle of raising the receptacle from the conveyor, filling the receptacle and thereafter lowering the filled receptacle back onto the conveyor, said trip arm being arranged to engage the receptacle on the table as the latter is lowered to be moved by the receptacle out of the path of movement of the receptacle on the conveyor and permit the filled receptacle to be moved by the conveyor off the elevating table.

22. In a mechanism for filling receptacles carried on a conveyor, the combination of a conveyor, a filling mechanism disposed above said conveyor intermediate the ends thereof, an elevating table disposed below said filling mechanism, means operative to raise said table and thereafter lower the table, means responsive to raising of said table for operating said filling mechanism, a trip arm positioned to be engaged by the receptacles advanced by the conveyor onto said table and moved thereby in one direction, means responsive to movement of said trip arm in said one direction for actuating said table operating means to initiate a cycle of raising the receptacle, filling the raised receptacle and thereafter lowering the filled receptacle back onto the conveyor, said trip arm being arranged to be engaged by the receptacle as the latter is lowered to be moved thereby in the opposite direction out of the path of movement of the receptacle on the conveyor and permit the filled receptacle to be moved by the conveyor off the elevating table.

23. In a mechanism for filling receptacles carried on a conveyor, the combination of a conveyor, a filling mechanism disposed above the conveyor intermediate the ends thereof, an elevating table disposed below said filling mechanism, table operating means adapted upon actuation to raise said table, maintain the table in its raised position a preselected time interval and thereafter lower the table, means responsive to raising of said table for operating said filling mechanism, and means including a trip arm positioned to be engaged by a receptacle advanced by the conveyor onto the table for actuating said table operating means and thereby initiate the cycle of raising the table, filling the receptacle and lowering the filled receptacle back onto the conveyor, said trip arm being arranged to engage the underside of the filled receptacle as the latter is lowered back onto the conveyor to be moved thereby out of the path of movement of the filled receptacle on the conveyor, said trip arm moving back into the path of the advancing containers after the filled receptacle has moved off the trip arm.

24. In a mechanism for filling receptacles carried on a conveyor, the combination of a conveyor, a filling mechanism disposed above the conveyor intermediate the ends thereof, an elevating table disposed below said filling mechanism, table operating means adapted upon actuation to raise said table, maintain the table in its raised position a preselected time interval and thereafter lower the table, means responsive to raising of said table for operating said filling mechanism, a stop member mounted adjacent said conveyor in advance of the elevating table, a stop operating means adapted upon actuation to move the stop member into the path of the receptacles on the conveyor and upon deactuation to move out of the path of advance of the receptacles on the conveyor, control means common to said stop operating means and to said table operating means, a trip arm positioned in the path of advance of the receptacles on the conveyor for operating the control means to actuate the stop operating means and the table operating means when a receptacle is advanced by the conveyor onto the table, and means on the table for operating the control means to deactuate said table operating means and said stop operating means in response to lowering of said table.

25. In a mechanism for filling receptacles carried on a conveyor, the combination of a conveyor, a filling mechanism disposed above the conveyor intermediate the ends thereof, an elevating table disposed below said filling mechanism, table operating means adapted upon actuation to raise said table, maintain the table in its raised position a preselected time interval and thereafter lower the table, means responsive to raising of said table for operating said filling mechanism, a stop member mounted adjacent said conveyor in advance of the elevating table, stop operating means adapted upon actuation to move the stop into the path of the receptacles on the conveyor, control means normally positioned to actuate said stop operating means and said table operating means and movable to a second position to deactuate said operating means, a dog on the table engageable with the control means for moving the latter to said second position to deactuate the table operating means and said stop operating means when the table is lowered, and trip means disposed in the path of advance of receptacles onto the table for moving said dog out of engagement with said control means whereby the latter is operative to actuate said table operating means and said stop operating means.

26. In a mechanism for filling receptacles, a conveyor, an elevating table comprising a pair of upright support members located at opposite sides of the conveyor to permit the free passage of the conveyor therebetween, a guide rail mounted on the upper end of each of said support members having a horizontally disposed leg extending inwardly toward the conveyor and an upwardly extending leg, means slidably supporting said support members intermediate the ends thereof, a frame attached to the lower end of said support members to cause the latter to move in unison with each other, and means attached to said frame actuatable to raise and lower said table.

27. In a mechanism for filling receptacles, a conveyor, an elevating table comprising a pair of upright support members located at opposite sides of the conveyor to permit the free passage of the conveyor therebetween, a guide rail mounted on the upper end of each of said support members having a horizontally disposed leg extending inwardly toward the conveyor and an upwardly extending leg, means slidably supporting said support members intermediate the ends thereof, a frame attached to the lower ends of said support members to cause the latter to move in unison with each other, means attached to said frame actuatable to raise and lower said table, control means for said table raising means normally positioned to actuate said table raising means and movable to a second position to deactuate said table raising means, control operating means on said frame adapted to engage said control means when the table is in its lowered position for moving said control means to said second position to deactuate the table raising means, and trip means positioned in the path of advance of a receptacle onto the table for moving said control operating means out of engagement with said control means whereby the latter is operative to actuate the table raising means.

28. The combination of claim 27 including means for filling the receptacle, and means on said frame adapted to operate said filling means when the table is raised.

29. In a mechanism for filling a receptacle with material, the combination of feed means operative to discharge material into a receptacle, a motor having a driving connection to said feed means for operating the latter to discharge material at a fixed rate, a clutch in said driving connection from the motor to said feed means engageable to operatively connect said motor to said feed means, a rotary cam for controlling engagement and disengagement of said clutch to respectively connect and disconnect said motor from said feed means, a first means for rotating said cam to a preselected position to engage said clutch and connect said motor to said feed means, a second means for rotating said cam away from said preselected position to disengage said clutch and disconnect said motor from said feed means, drive means forming a driving connection from said motor to said cam, and manually adjustable means in said drive means for selectively varying the speed of rotation of said cam relative to said motor to vary the time during which said clutch means is engaged to connect the motor to the feed means.

30. In a mechanism for filling a receptacle with material, the combination of a feed means operative to discharge material, a motor having a drive shaft, a driven shaft operatively connected to said feed means for operating the latter, means for drivingly connecting said drive and driven shafts including a clutch engageable to operatively connect said drive and driven shafts and disengageable to disconnect the driving connection therebetween, a rotary cam for controlling engagement and disengagement of said clutch, means for rotating said cam to a preselected position to engage said clutch and connect said motor to said feed means, rotary means having a lost motion connection to said cam for rotating said cam away from said preselected position to disengage said clutch and disconnect said motor from said feed means, drive means forming a driving connection from said driven shaft to said rotary means, and a manually adjustable variable speed drive in said drive means for selectively varying the speed of rotation of said rotary means relative to said driven shaft to vary the time during which said clutch is engaged to connect the motor to the feed means.

References Cited in the file of this patent

UNITED STATES PATENTS

| Re. 23,888 | Mateer | Oct. 26, 1954 |
| 661,679 | Wyckoff | Nov. 13, 1900 |
| 2,029,299 | Anderson | Feb. 4, 1936 |
| 2,201,545 | Mazzonobile | May 21, 1940 |
| 2,250,603 | Poole | July 29, 1941 |
| 2,333,545 | Meyer | Nov. 2, 1943 |
| 2,355,089 | Le Frank | Aug. 8, 1944 |
| 2,533,641 | Vergobbi | Dec. 12, 1950 |
| 2,584,338 | Ferguson et al. | Feb. 5, 1952 |
| 2,613,021 | Bowes | Oct. 7, 1952 |
| 2,638,257 | Knobel | May 12, 1953 |